United States Patent
Abdalla et al.

(10) Patent No.: US 12,318,721 B2
(45) Date of Patent: *Jun. 3, 2025

(54) SELF-ASSISTING ELEMENT REMOVAL FEATURES FOR A FILTRATION SYSTEM

(71) Applicant: Cummins Filtration IP, Inc., Columbus, IN (US)

(72) Inventors: Wassem Abdalla, Fishers, IN (US); Ismail C. Bagci, Cookeville, TN (US); Robert A. Bannister, Ames, IA (US); Joshua Luther Young, Livingston, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,771

(22) Filed: Sep. 29, 2023

(65) Prior Publication Data

US 2024/0017194 A1 Jan. 18, 2024

Related U.S. Application Data

(62) Division of application No. 16/768,745, filed on Jun. 1, 2020, now Pat. No. 11,786,851, which is a division
(Continued)

(51) Int. Cl.
*B01D 35/30* (2006.01)
*B01D 29/33* (2006.01)
(Continued)

(52) U.S. Cl.
CPC ........... *B01D 35/306* (2013.01); *B01D 29/33* (2013.01); *B01D 29/96* (2013.01); *F02M 37/42* (2019.01);
(Continued)

(58) Field of Classification Search
CPC .. B01D 35/306; B01D 29/96; B01D 46/2414; B01D 2201/295; B01D 2201/301;
(Continued)

(56) References Cited

U.S. PATENT DOCUMENTS

| 3,857,687 A | 12/1974 | Hamilton et al. |
| 4,336,043 A | 6/1982 | Aonuma et al. |

(Continued)

FOREIGN PATENT DOCUMENTS

| CA | 2374697 | 9/2002 |
| CN | 1708340 A | 12/2005 |

(Continued)

OTHER PUBLICATIONS

First Office Action for Chinese Patent App. No. 201780098105.7 dated Nov. 9, 2020, 9 pages (with translation).
(Continued)

*Primary Examiner* — Benjamin M Kurtz
(74) *Attorney, Agent, or Firm* — Foley & Lardner LLP

(57) ABSTRACT

A filtration assembly includes a filter housing and a filter element. The filter housing includes a base and a cover including an underside having one or more retainer features. The cover is removably coupled to the base. The filter element is removably installed within the base when the cover is coupled to the base. The filter element includes filter media and an endplate coupled to one end of the filter media. The endplate includes an outer perimeter and one or more engagement features protruding from the outer perimeter. The one or more engagement features engage the one or more retainer features in the cover upon installation of the endplate into the cover, thereby coupling the endplate to the cover.

12 Claims, 14 Drawing Sheets

Related U.S. Application Data of application No. PCT/US2017/064667, filed on Dec. 5, 2017.

(51) Int. Cl.
  *B01D 29/96* (2006.01)
  *F02M 37/42* (2019.01)
(52) U.S. Cl.
  CPC .. *B01D 2201/295* (2013.01); *B01D 2201/301* (2013.01); *B01D 2201/40* (2013.01)
(58) Field of Classification Search
  CPC ........ B01D 2201/305; B01D 2201/306; B01D 2201/40; B01D 2201/4007; B01D 2265/02; B01D 2265/022; B01D 2265/025; B01D 2265/028; F02M 37/42
  See application file for complete search history.

(56) References Cited

U.S. PATENT DOCUMENTS

| | | | |
|---|---|---|---|
| 4,681,609 | A | 7/1987 | Howeth |
| 4,775,398 | A | 10/1988 | Howeth |
| 5,017,285 | A | 5/1991 | Janik et al. |
| 5,301,958 | A | 4/1994 | Covington |
| 5,304,312 | A | 4/1994 | Forster et al. |
| 5,342,519 | A | 8/1994 | Friedmann et al. |
| 5,814,219 | A | 9/1998 | Friedmann et al. |
| 5,846,417 | A | 12/1998 | Jiang et al. |
| 6,006,924 | A | 12/1999 | Sandford |
| 6,113,781 | A | 9/2000 | Popoff et al. |
| 6,149,700 | A | 11/2000 | Morgan et al. |
| 6,158,592 | A | 12/2000 | Reinhart et al. |
| 6,299,661 | B1 | 10/2001 | Bloomer |
| 6,328,883 | B1 | 12/2001 | Jensen |
| 6,334,881 | B1 | 1/2002 | Giannetta et al. |
| 6,506,303 | B1 | 1/2003 | Gustafsson et al. |
| 11,786,851 | B2 * | 10/2023 | Abdalla ............. B01D 46/2414 210/457 |
| 2003/0132158 | A1 | 7/2003 | Clausen et al. |
| 2004/0255783 | A1 | 12/2004 | Graham et al. |
| 2006/0157403 | A1 | 7/2006 | Harder et al. |
| 2007/0163947 | A1 | 7/2007 | Clausen et al. |
| 2009/0127170 | A1 | 5/2009 | Kolczyk et al. |
| 2009/0308802 | A1 | 12/2009 | Beard et al. |
| 2010/0044295 | A1 | 2/2010 | Honermann et al. |
| 2010/0192529 | A1 | 8/2010 | Schuster |
| 2010/0224539 | A1 | 9/2010 | Luther et al. |
| 2012/0223006 | A1 | 9/2012 | Sann et al. |
| 2013/0327696 | A1 | 12/2013 | Bagci et al. |
| 2014/0217001 | A1 | 8/2014 | Vercammen |
| 2014/0305858 | A1 | 10/2014 | Downs et al. |
| 2015/0202556 | A1 | 7/2015 | Hawkins et al. |
| 2016/0023142 | A1 | 1/2016 | Arakeri et al. |
| 2016/0184750 | A1 | 6/2016 | Eberle et al. |
| 2016/0317955 | A1 | 11/2016 | Jokschas et al. |
| 2017/0014738 | A1 | 1/2017 | Malgorn et al. |
| 2017/0080365 | A1 | 3/2017 | Morris et al. |
| 2017/0120168 | A1 | 5/2017 | Stamey et al. |

FOREIGN PATENT DOCUMENTS

| | | |
|---|---|---|
| CN | 101084050 A | 12/2007 |
| CN | 201094880 | 8/2008 |
| CN | 201818404 | 5/2011 |
| CN | 201855623 | 6/2011 |
| CN | 102264446 A | 11/2011 |
| CN | 102872644 | 1/2013 |
| CN | 104780992 A | 7/2015 |
| CN | 105229294 | 1/2016 |
| CN | 206419137 | 8/2017 |
| DE | 10 2007 062 100 | 6/2009 |
| DE | 202007018076 | 6/2009 |
| DE | 10 2011 010 076 | 8/2012 |
| EP | 1 008 375 | 6/2000 |
| GB | 1 336 647 | 11/1973 |
| GB | 1 488 500 A | 10/1977 |
| WO | WO-2008/134494 A2 | 11/2008 |
| WO | WO-2012/025640 A1 | 3/2012 |
| WO | WO-2018/134626 A1 | 7/2018 |

OTHER PUBLICATIONS

First Office Action issued for Chinese issued Jun. 24, 2021, with English language translation 23 pages.
International Search Report & Written Opinion for PCT/US2017/064667 dated Feb. 1, 2018, 10 pages.
Non-Final Office Action issued for U.S. Appl. No. 16/768,745 issued Jan. 12, 2022, 24 pages.
Office Action issued for Chinese Patent Application No. CN 2021102801678 issued Feb. 24, 2022, 10 pages.

* cited by examiner

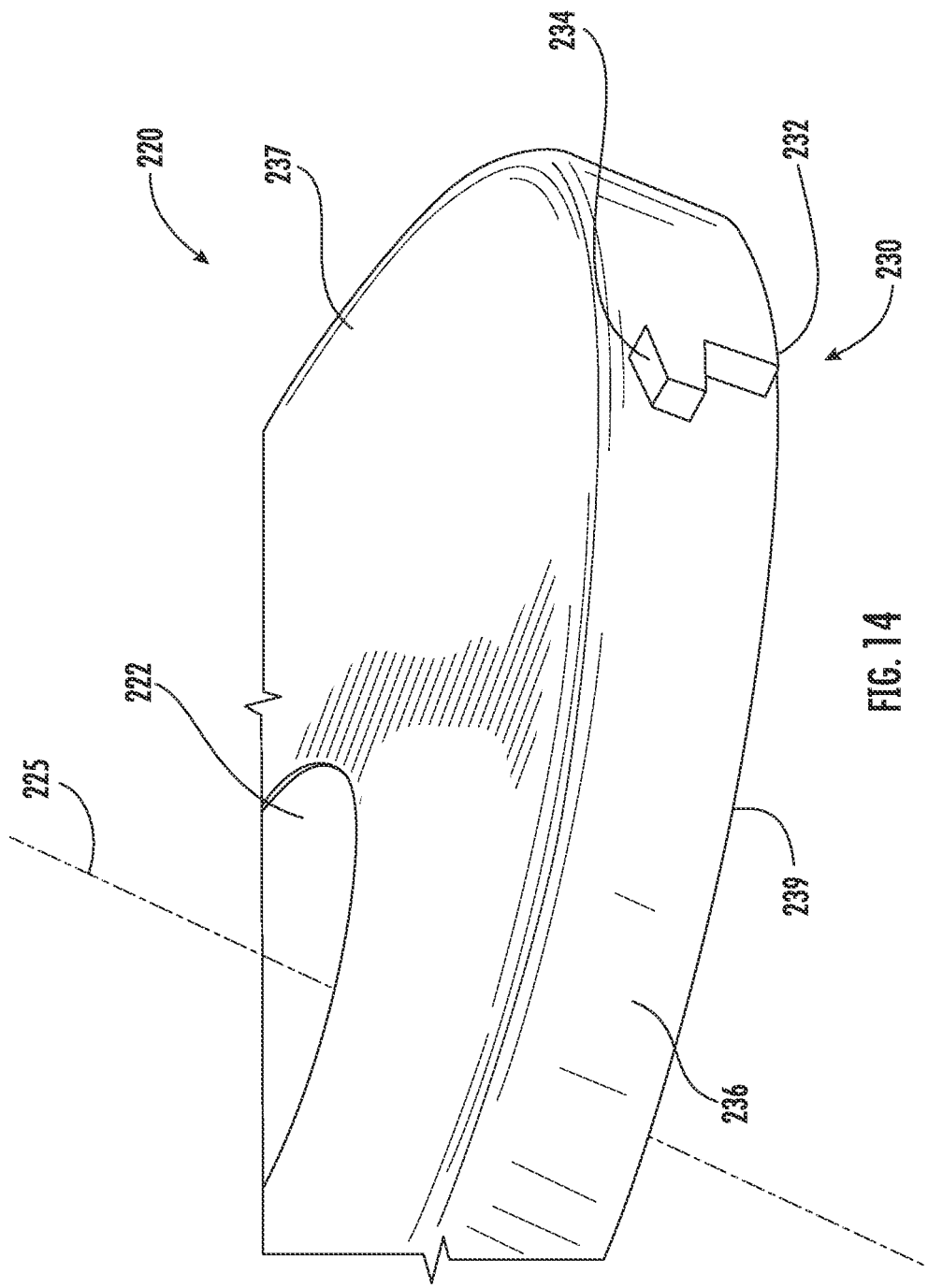

SELF-ASSISTING ELEMENT REMOVAL FEATURES FOR A FILTRATION SYSTEM

CROSS-REFERENCE TO RELATED APPLICATIONS

The present application is a divisional of U.S. patent application Ser. No. 16/768,745, filed Jun. 1, 2020 which is a National Phase Application based on PCT/US2017/064667. The disclosures of these applications are hereby incorporated by reference in their entireties.

TECHNICAL FIELD

The present invention relates generally to filter assemblies for filtering fluids in internal combustion engine systems.

BACKGROUND

Internal combustion engines generally combust a mixture of fuel (e.g., gasoline, diesel, natural gas, etc.) and air. Many or all of the fluids passing through the internal combustion engine are filtered to remove particulate and contaminants from the fluids prior to entering the internal combustion engine. For example, prior to entering the engine, fuel to be combusted is typically passed through a filter element to remove contaminants (e.g., particulates, dust, water, etc.) from the fuel prior to delivery to the engine. The filter media of the filter element captures and removes particulate from the fuel passing through the filter media. The filter element may need to be removed from the filter assembly to be cleaned or serviced.

SUMMARY

According to one embodiment, the invention includes a filtration assembly. The filtration assembly includes a filter housing and a filter element. The filter housing includes a base and a cover including an underside having one or more retainer features. The cover is removably coupled to the base. The filter element is removably installed within the base when the cover is coupled to the base. The filter element includes filter media and an endplate coupled to one end of the filter media. The endplate includes an outer perimeter and one or more engagement features protruding from the outer perimeter. The one or more engagement features engage the one or more retainer features in the cover upon installation of the endplate into the cover, thereby coupling the endplate to the cover.

According to another embodiment, the invention includes a filter element. The filter element includes filter media and an endplate coupled to one end of the filter media. The endplate includes an outer perimeter and one or more engagement features protruding from the outer perimeter. The one or more engagement features engage one or more retainer features in a cover of a filter housing upon installation of the endplate into the cover, thereby coupling the endplate to the cover.

According to another embodiment, the invention includes a filter housing. The filter housing includes a base and a cover. The cover is removably coupled to the base. The cover comprises an underside having one or more retainer features protruding from the underside. The one or more retainer features engage one or more engagement features of an endplate of a filter element upon installation of the endplate into the cover, thereby coupling the endplate to the cover.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 14 shows a top perspective view of a top endplate of the filtration system of FIG. 1, in accordance with another embodiment.

DETAILED DESCRIPTION

Referring to the figures generally, a filtration system having a filter element removably received in a filter housing is described. The filter housing comprises a base and a cover. The filter element includes filter media and a top endplate that includes one or more engagement features that interact with one or more features on the filter housing (e.g., the cover of the filter housing). The interaction between the engagement features of the top endplate and the retainer features facilitate the simultaneous removal of the filter element when the cover of the filter housing is separated (e.g., unscrewed) from the base. The filter element may be removed from the filter housing for servicing purposes.

The systems described herein can be used in any number of fluid systems including, but not limited to, a fuel or oil filtration system. For example, such systems may be used in a filtration system for an engine such as a diesel or gasoline engine, a hydraulic fluid filtration system in a hydraulic system, other engine fluid filtration systems on diesel or gasoline engines, as well as filtration systems used in non-engine applications. In one exemplary application, the filtration system described herein is used in a fuel system for filtering fuel, for example diesel fuel. While the filtration systems shown and described herein are described as a "top load" design, alternative designs, for example, bottom loads are possible. For example, in a bottom load embodiment, the engagement features may be positioned on the bottom endplate and the retainer features may be positioned on the base portion of the filter housing.

Figure 1:
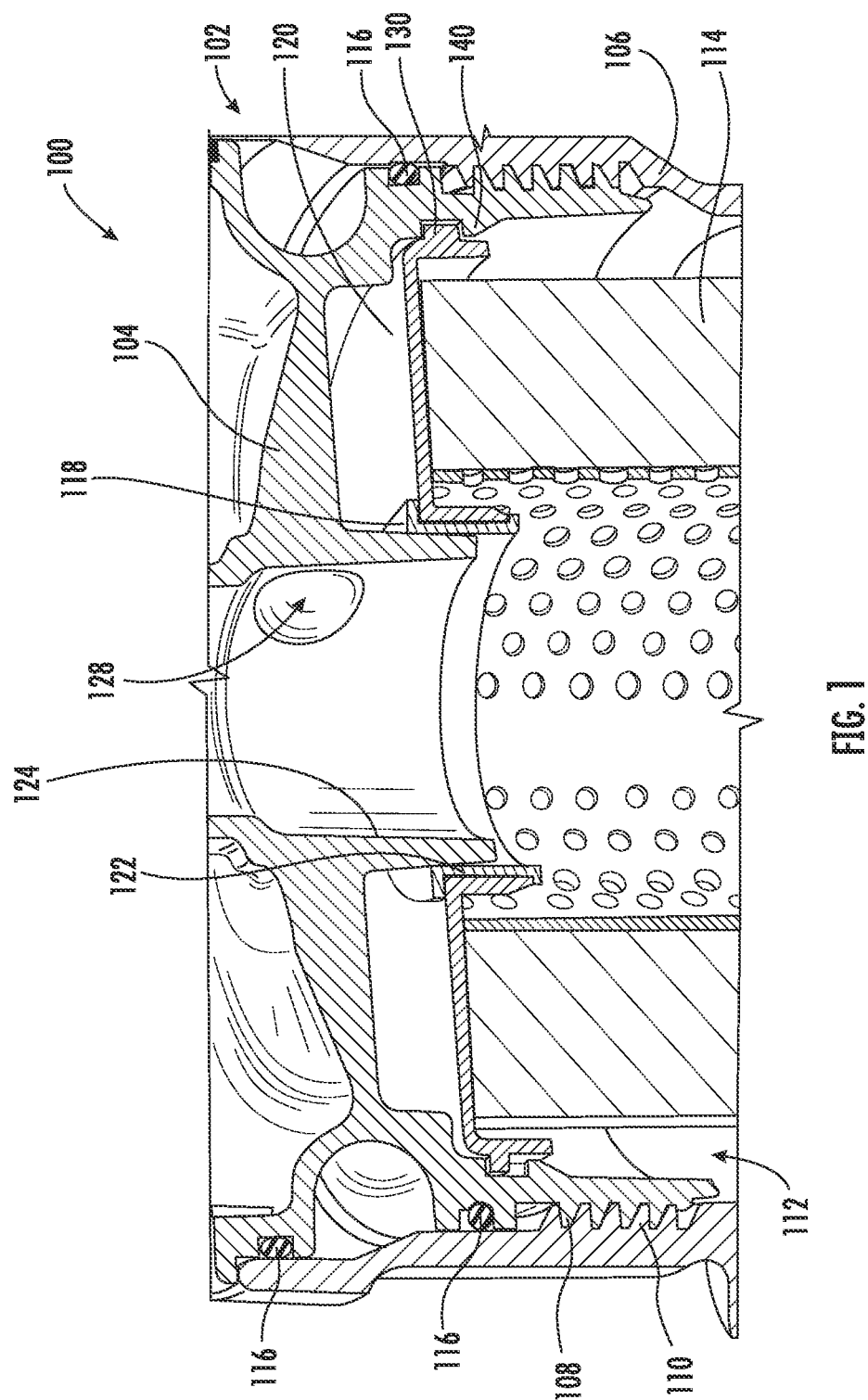
FIG. 1 shows a perspective view of a filtration system, according to an example embodiment.
Figure 2:
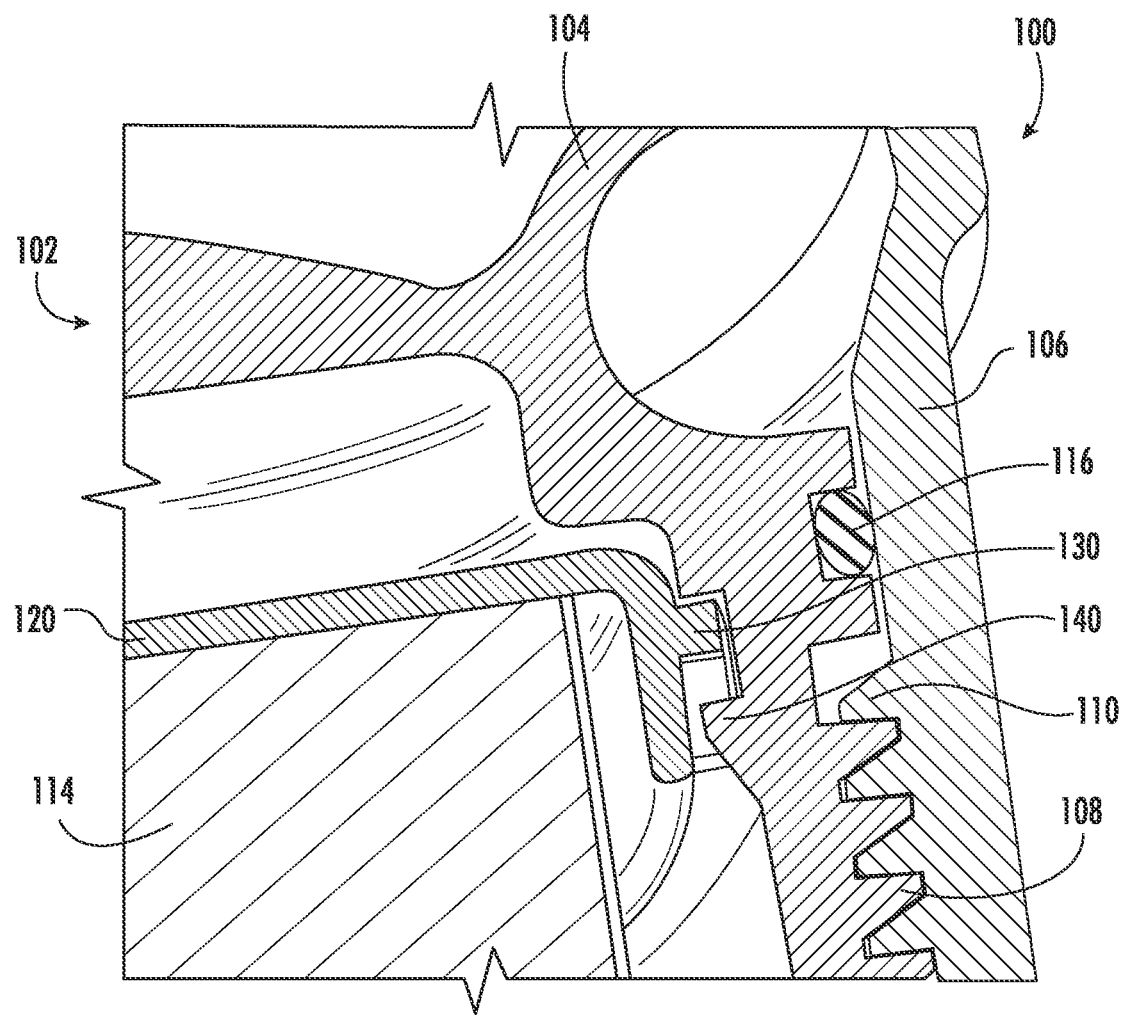
FIG. 2 shows a perspective view of a portion of the filtration system of FIG. 1.
Figure 3:
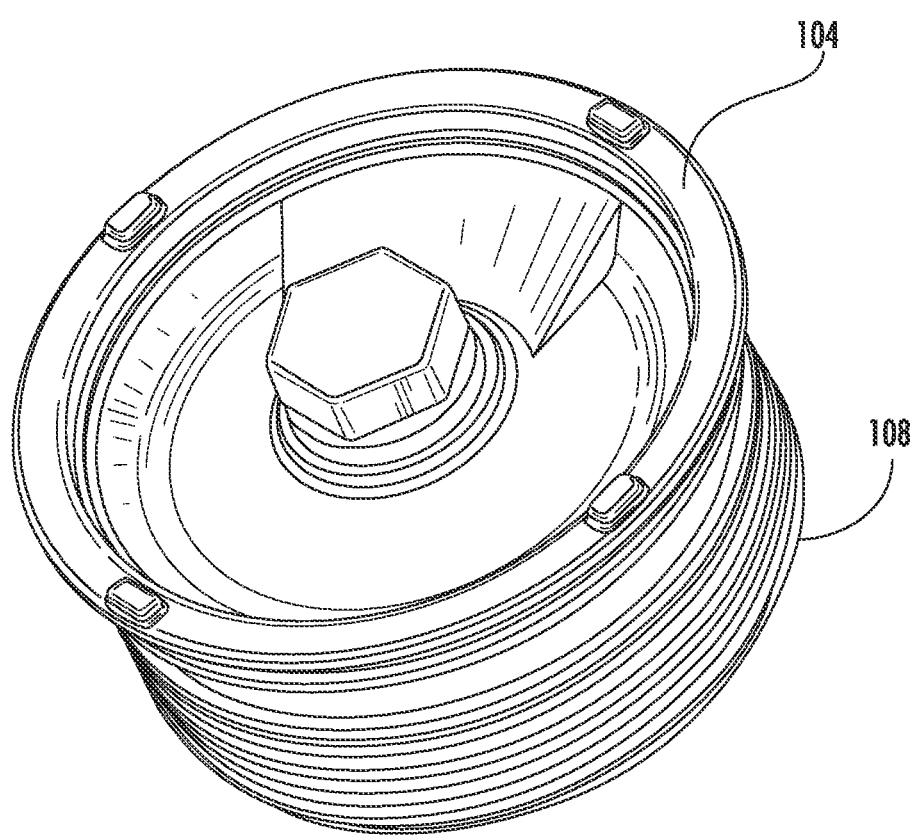
FIG. 3 shows a top perspective view of a cover of the filtration system of FIG. 1.
Figure 4:
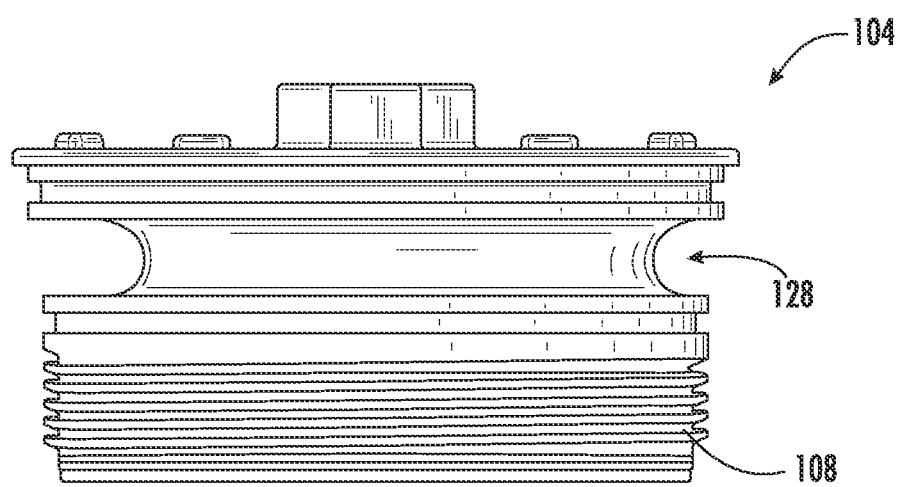
FIG. 4 shows a front view of the cover of FIG. 3.
Figure 5:
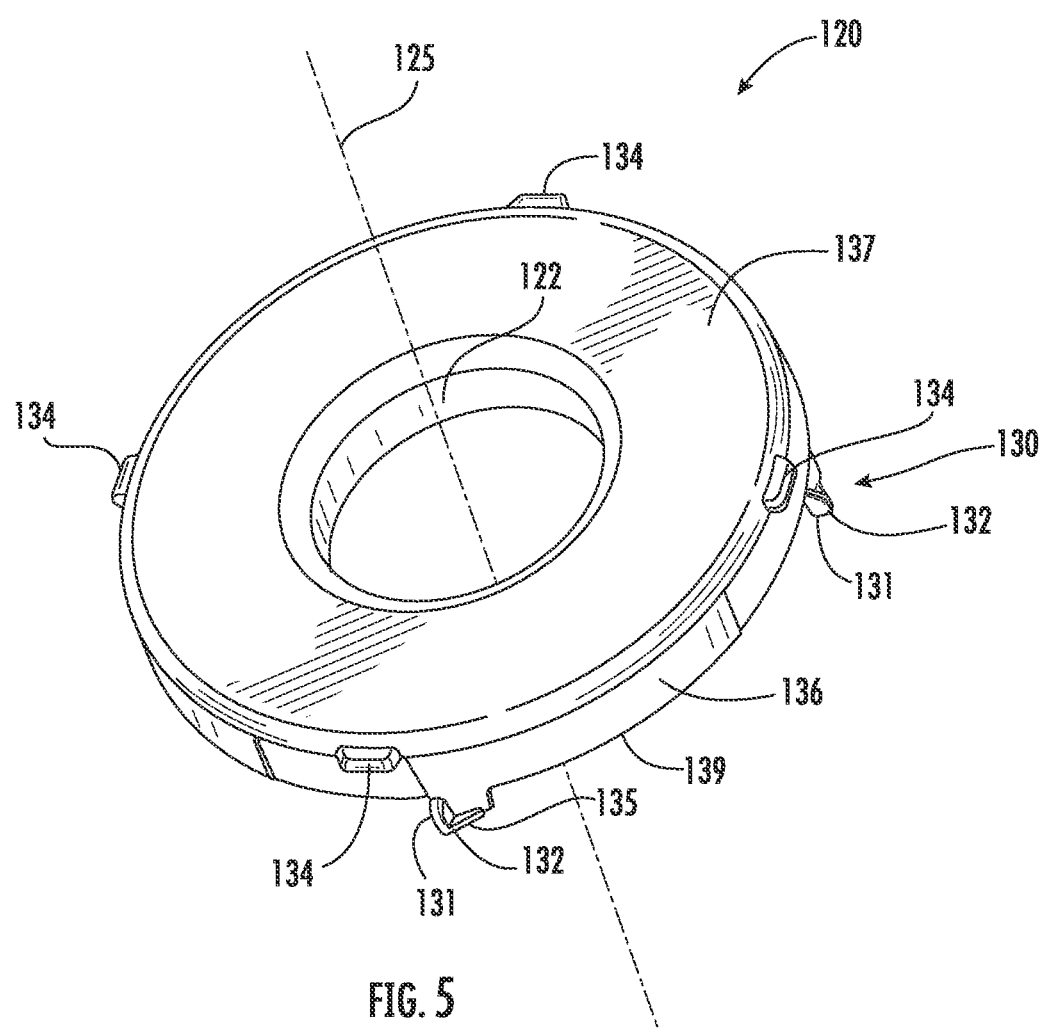
FIG. 5 shows a top perspective view of a top endplate of the filtration system of FIG. 1, in accordance with one embodiment.
Figure 6:
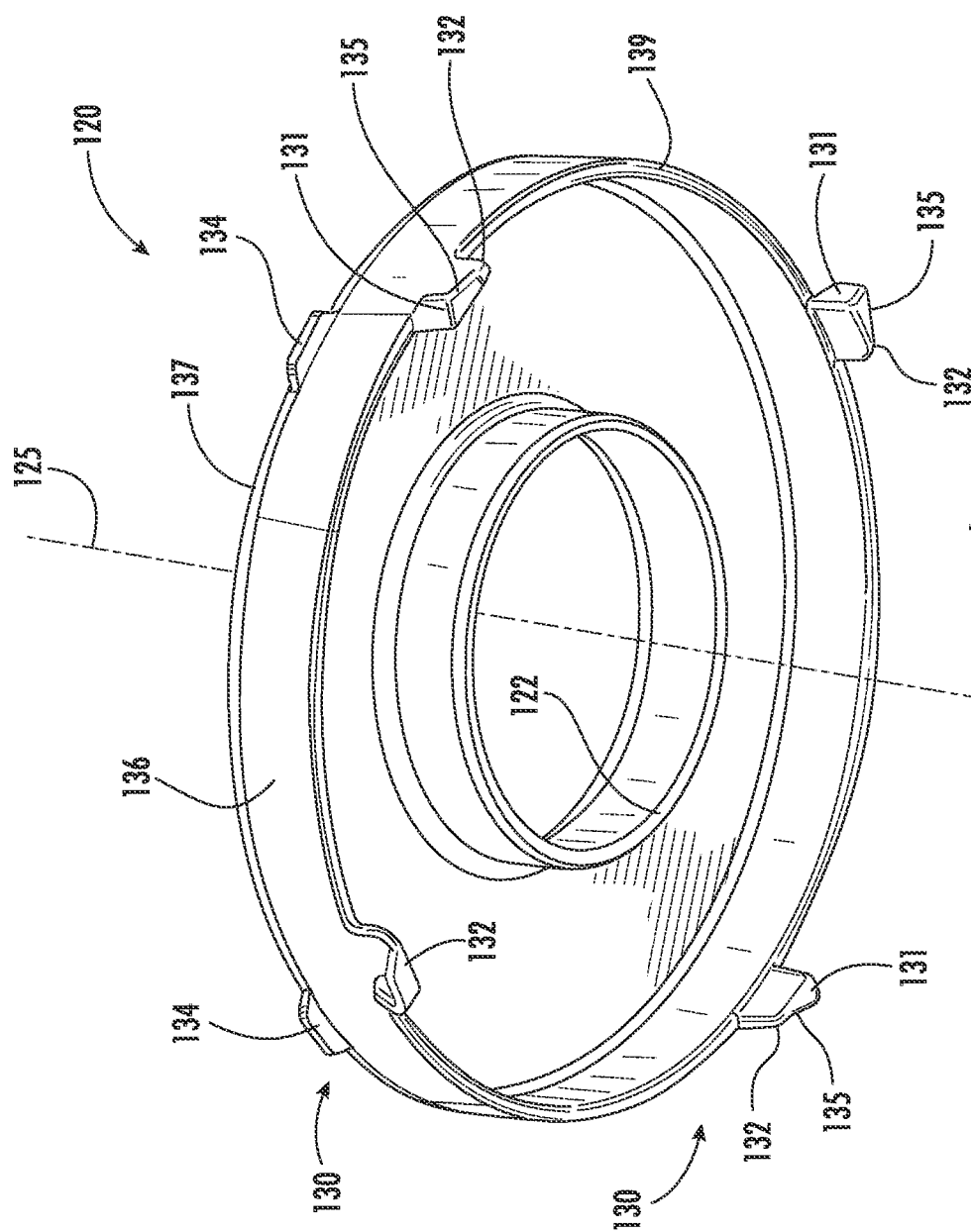
FIG. 6 shows a bottom perspective view of the top endplate of FIG. 5.
Figure 7:
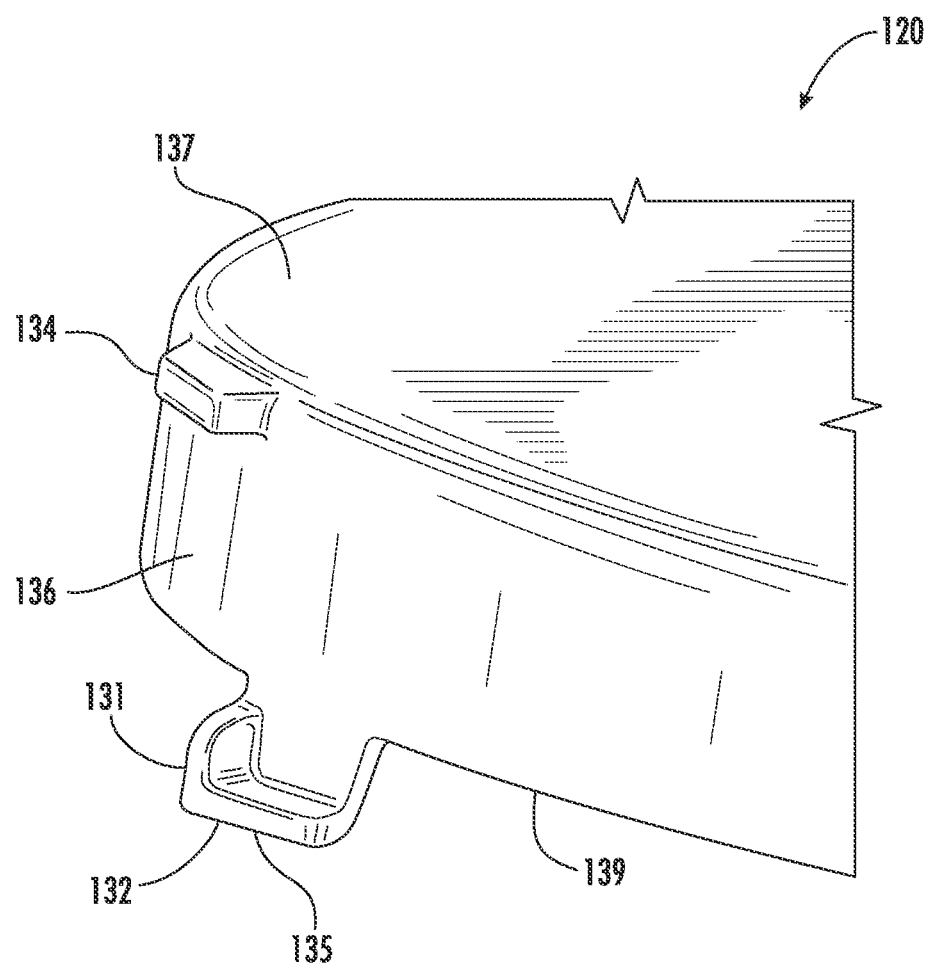
FIG. 7 shows a portion of a top perspective view of the top endplate of FIG. 5.
Figure 8:
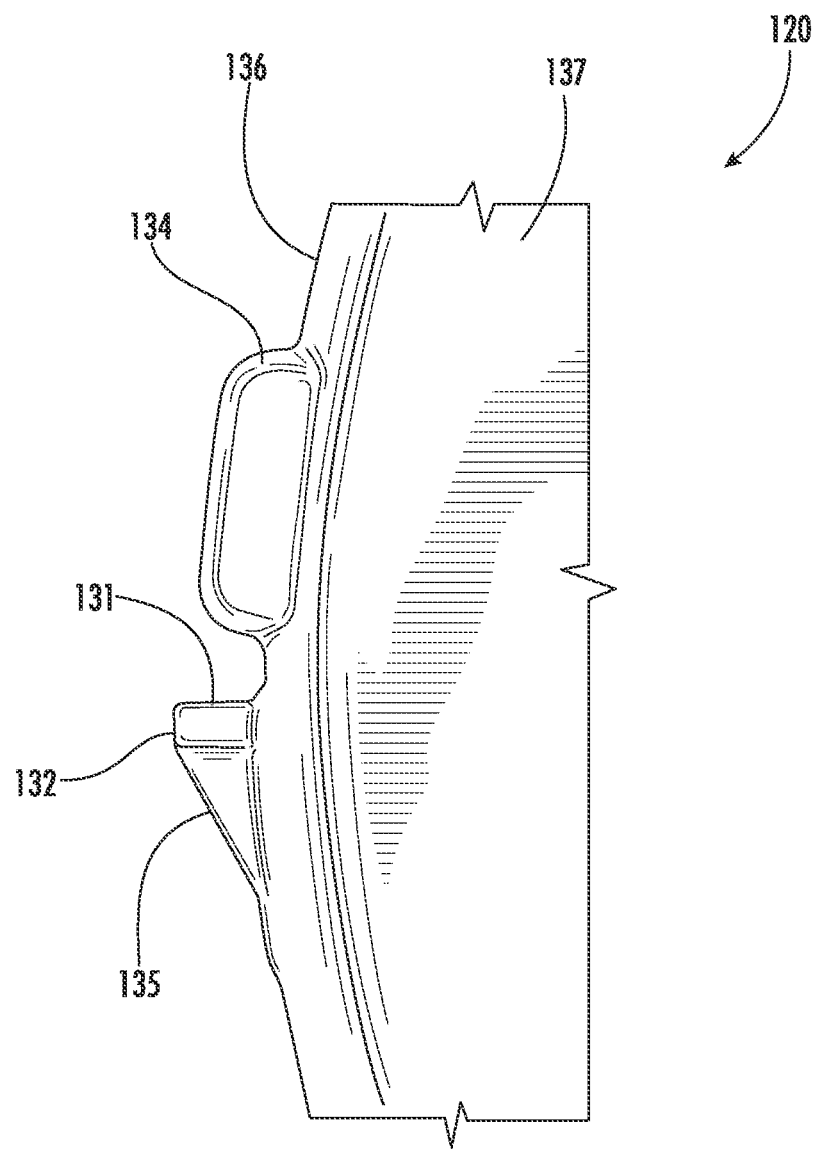
FIG. 8 shows a portion of a top view of the top endplate of FIG. 5.

FIG. 1 shows a cross-sectional view of a filtration system 100 according to an example embodiment. FIG. 2 shows a portion of the cross-sectional view of FIG. 1. In the filtration system 100 of FIG. 1, the filtration system 100 is a liquid (e.g., fuel, oil, water, etc.) filtration system. The filtration system 100 includes a filter element 112 and a filter housing 102 formed by a cover 104 and a base 106. The filter housing 102 includes an inlet (not shown) for receiving fluid to be filtered, an outlet 128 formed in the cover 104, and a central compartment that receives the filter element 112. The cover 104 is removably coupled to the base 106 via a threaded connection formed by first threads 108 on the cover 104 and second threads 110 on the base 106. FIGS. 3 and 4 show the cover 104. The filter housing 102 can be made of any material suitable for use in a fluid filter, for example metal or plastic. While the housing 102 is shown as cylindrical in shape, other housing shapes can be used.

The filtration system 100 includes a filter element 112. The filter element 112 is removably installed within the base 106 such that when the cover 104 is installed onto (e.g., threaded onto) the base 106, the filter element 112 is also installed in the base 106. Generally, fluid to be filtered flows into the base 106, through the filter element 112 in an outside-in flow arrangement, and out of the filter housing 102 (e.g., via the cover 104). In other embodiments, fluids to be filtered flow through the filter element 112 in an inside-out flow arrangement. As shown in FIG. 2, when installed, the cover 104 is sealed against the inner wall of the base 106 by one or more sealing members 116. In some arrangements, the sealing members 116 comprise O-rings.

The filter element 112 includes a top endplate 120 coupled to a first end of the filter media 114 of the filter element 112. The filter element 112 also includes a bottom endplate (not shown) coupled to a second end of the filter media 114. The top endplate 120 includes an endplate central opening 122 that allows filtered fluid to flow out of the filter element 112. A cover central opening 124 defined in the cover 104 is received within the endplate central opening 122 to form a central passage 126 through which filtered fluid flows into the cover 104. A gasket 118 is positioned between the endplate central opening 122 and the cover central opening 124 to seal the top endplate 120 to the cover 104. The filtered fluid flows out of the cover 104 through outlet 128 formed in the cover 104. The top endplate 120 includes one or more engagement features 130, and the cover 104 includes one or more retainer features 140. The engagement features 130 interact with the retainer features 140 to rotationally lock the filter element 112 with respect to the cover 104. Accordingly, when the cover 104 is installed by rotating the cover 104 into the base 106, the filter element 112 rotates with the cover 104. When the cover 104 is uninstalled (e.g., unscrewed) from the base 106, the filter element 112 rotates and moves axially out of the base 106 together with the cover 104.

Referring to FIGS. 5-8, various views of the top endplate 120 are shown. The top endplate 120 includes a top surface 137 and a bottom surface 139, with an outer perimeter 136 extending therebetween. The endplate central opening 122 extends through the top endplate 120 along a longitudinal axis 125. The top endplate 120 also includes one or more engagement features 130 protruding outward from the outer perimeter 136. The engagement features 130 are configured to interact with retainer features 140 in the cover 104 upon installation of the top endplate 120 into the cover 104. In the embodiment depicted in FIGS. 5-8, multiple engagement features are shown. In other embodiments, only one engagement feature 130 is included. Each engagement feature 130 includes a post 134 and a tab 132. As shown, the posts 134 are positioned proximate the top surface 137 of the top endplate 120, and the tabs 132 are positioned proximate the bottom surface 139 of the top endplate 120. The tabs 132 may extend below (e.g., overhang) the bottom surface 139 of the top endplate 120.

Each of the tabs 132 possesses a sloped portion 135 (e.g., a ramped surface) and a tab wall portion 131. The tab wall portion 131 extends axially along the outer perimeter 136. The tab wall portion 131 is configured to contact a protrusion wall portion 145 of the cover 104 when the top endplate 120 is installed into the cover 104, as discussed further herein. The sloped portion 135 extends outward from the outer perimeter 136, with an angle of the sloped portion 135 increasing in a clockwise direction when the top endplate 120 is viewed from above the top surface 137. The sloped portion 135 thus extends between the outer perimeter 136 and the tab wall portion 131, with the largest angled portion of each sloped portion 135 proximate the tab wall portion 131.

Each sloped portion 135 facilitates the installation of the top endplate 120 into the cover 104. The sloped portion 135 specifically facilitates the counter-clockwise direction of rotation (when viewed from above the top surface 137) of the top endplate 120 when inserting the top endplate 120 into the cover 104 (or the clockwise direction of rotation of the cover 104 when viewed from above the top surface 137). In other embodiments, the sloped portion 135 may be oppositely positioned such that the angle of each sloped portion 135 decreases in a clockwise direction when the top endplate 120 is viewed from above the top surface 137. In this embodiment, the sloped portion 135 facilitates a clockwise direction of rotation (when viewed from above the top surface 137) of the top endplate 120 when inserting the top endplate 120 into the cover 104. Each tab 132 is flexible in nature such that when installing the top endplate 120 into the cover 104, each tab 132 flexes inward toward the central opening 122.

Each post 134 extends along the outer perimeter 136 in a substantially perpendicular direction to the tab wall portion 131, i.e. a "long" surface of each post extends perpendicular to the longitudinal axis 125 of the top endplate 120. In other embodiments, the post 134 is otherwise angled relative to the tab wall portion 131. Each post 134 is configured to slide into and out of a slot 144 on the cover 104, as described further herein. The post 134 may be rigid or flexible in nature.

Figure 9:
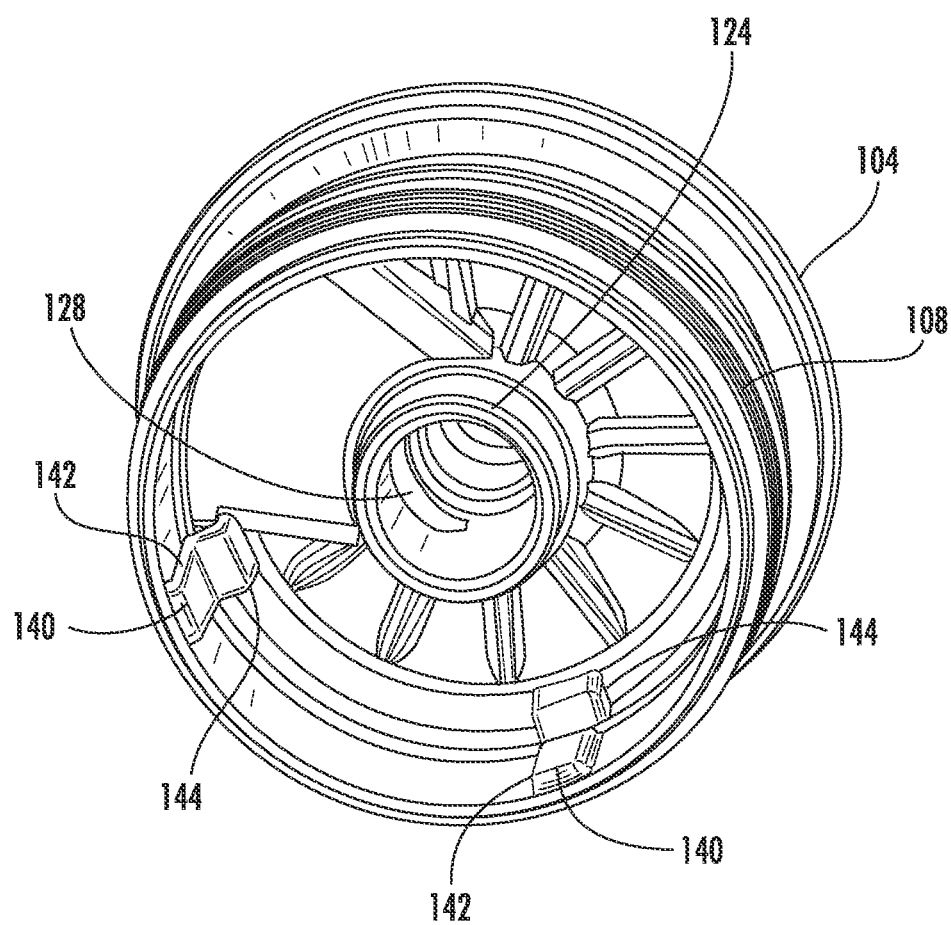
FIG. 9 shows a bottom perspective view of the cover of FIG. 3.
Figure 10:
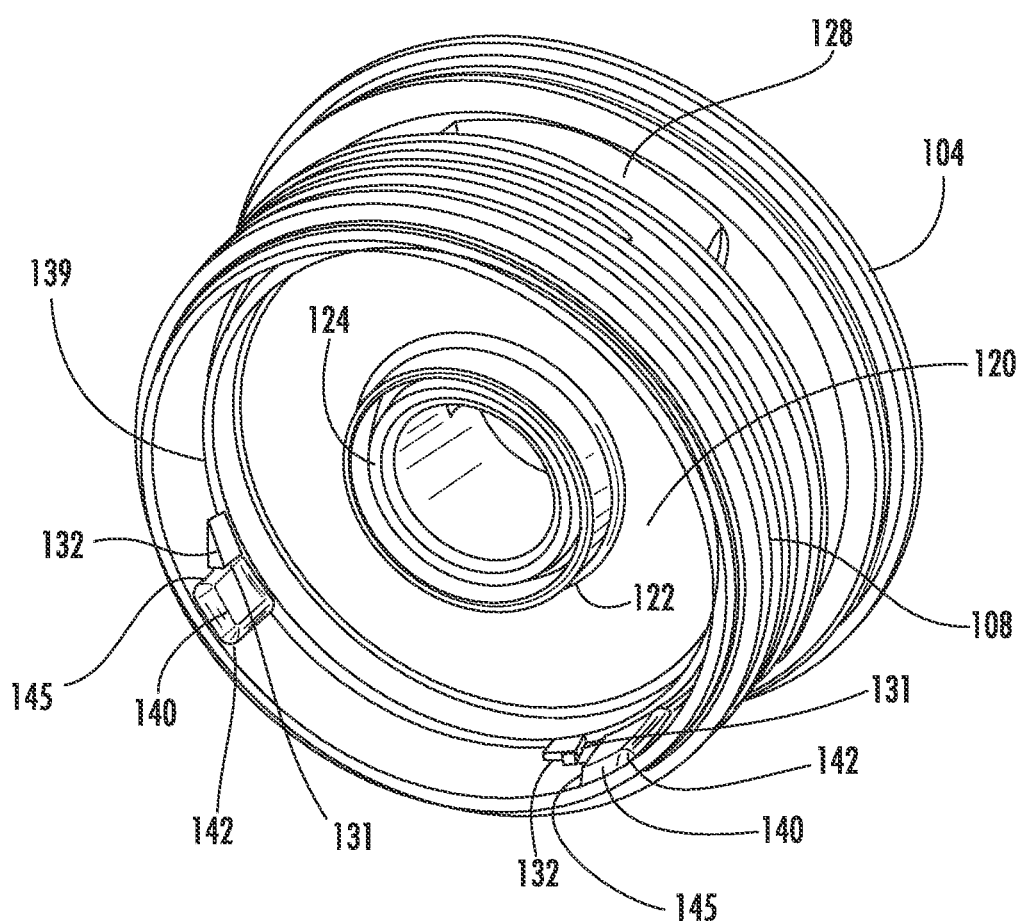
FIG. 10 shows a bottom perspective view of the top endplate of FIG. 5 installed on the cover of FIG. 3.
Figure 11:
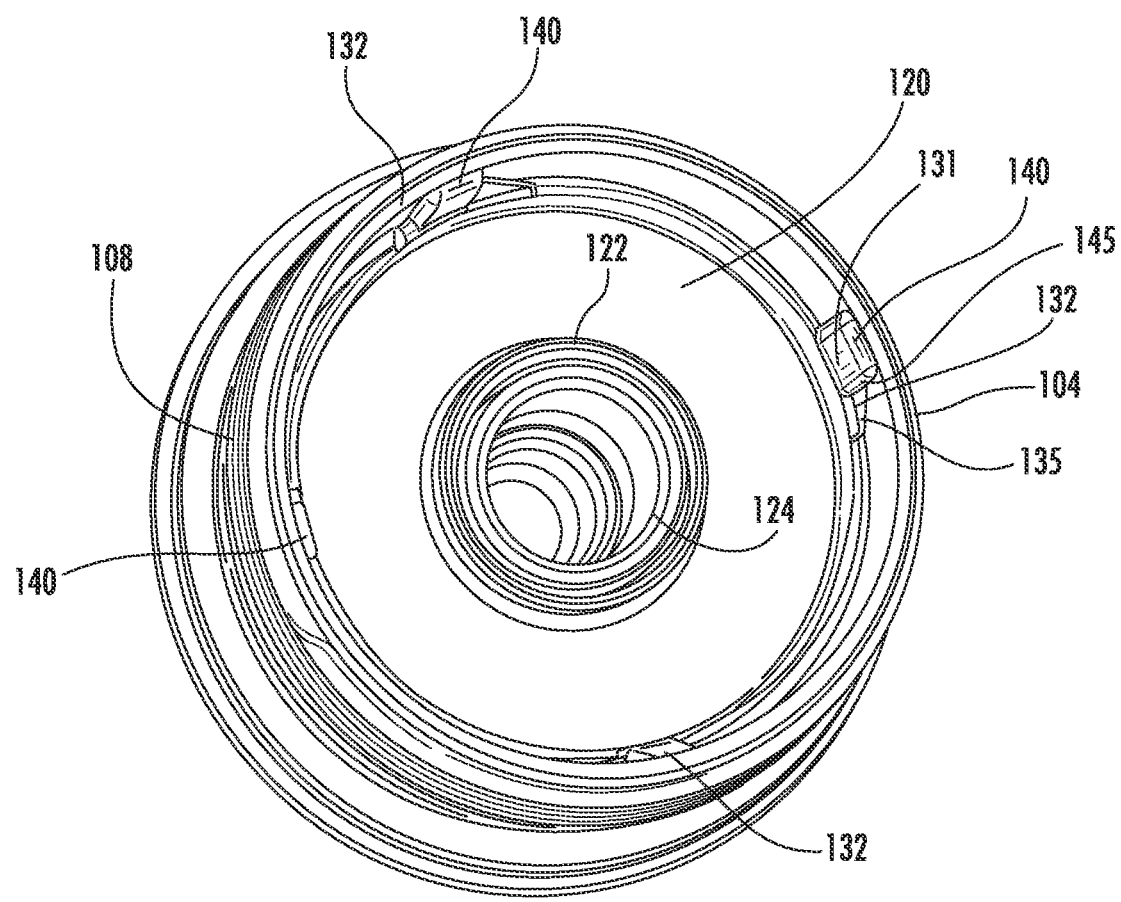
FIG. 11 shows a bottom perspective view of the top endplate of FIG. 5 installed on the cover of FIG. 3.
Figure 12:
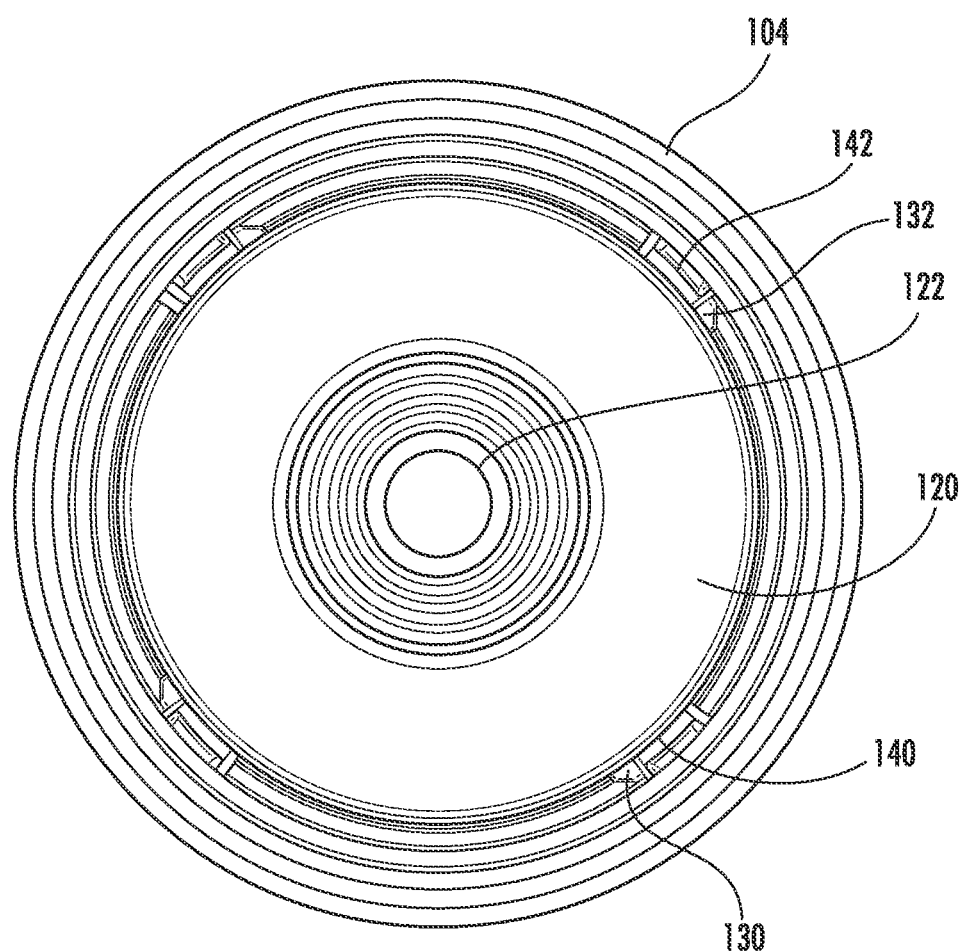
FIG. 12 shows a bottom view of the top endplate of FIG. 5 installed on the cover of FIG. 3.

Referring to FIG. 9, a bottom perspective view of the cover 104 without the top endplate 120 is shown. The cover 104 includes one or more retainer features 140 positioned on the underside inner perimeter of the cover 104. In the embodiment depicted in FIG. 9, a plurality of retainer features 140 are included, with a 1:1 ratio between the retainer features 140 and the engagement features 130 of the top endplate 120. In other embodiments, however, only a single retainer feature 140 may be included (for example, when the top endplate 120 includes only a single engagement feature 130). Each retainer feature 140 includes a protrusion 142 and a slot 144. The protrusions 142 extend substantially axially along the inner perimeter of the cover 104. Each slot 144 forms a pathway (e.g., groove) along the inner perimeter of the cover 104 to receive a post 134 of the top endplate 120. The slots 144 extend in a substantially perpendicular direction to the protrusions 142. In other embodiments, the slots 144 are otherwise angled relative to the protrusions 142.

Figure 13:
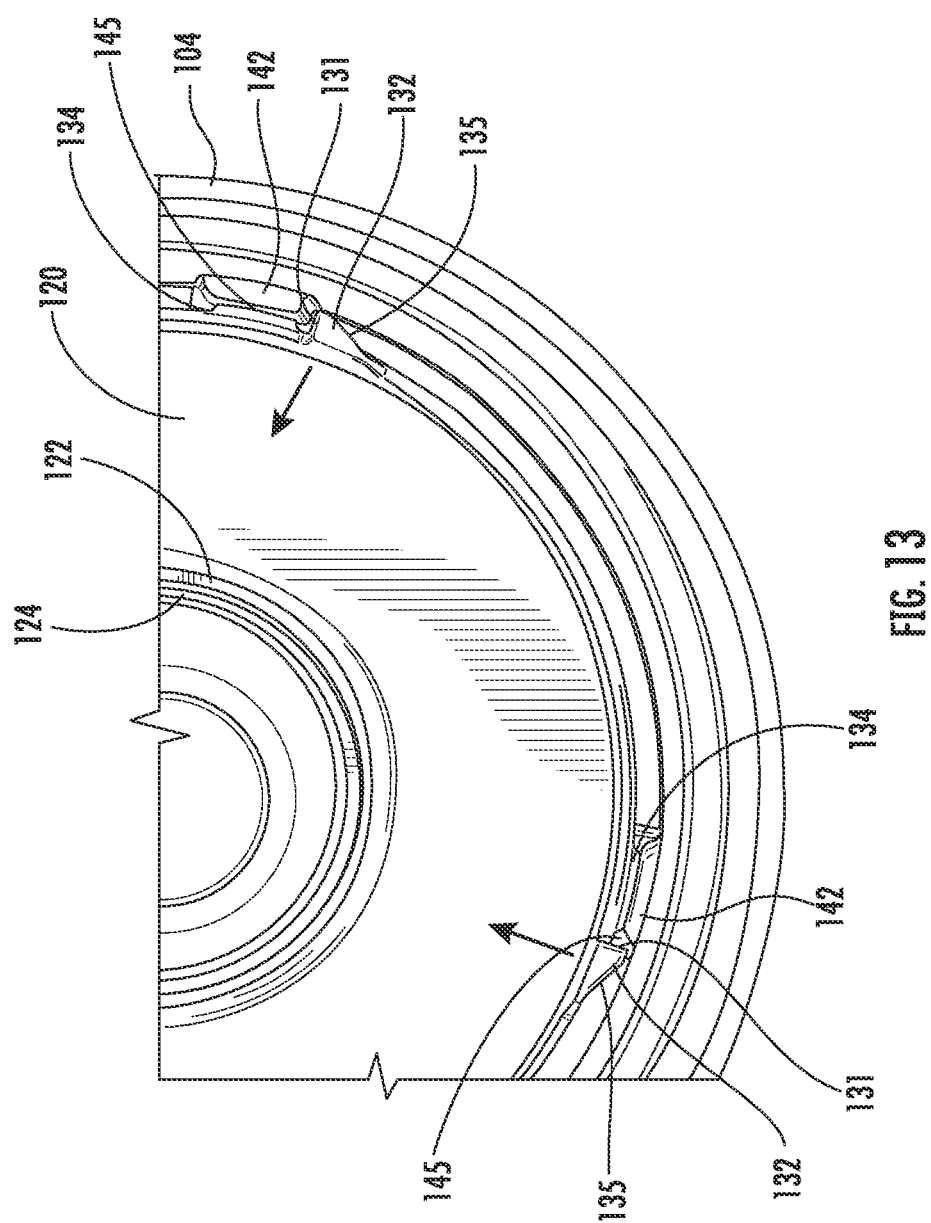
FIG. 13 shows a portion of a bottom view of the top endplate of FIG. 5 installed on the cover of FIG. 3.

Referring to FIGS. 10-13, various views of the cover 104 with the top endplate 120 installed are shown. As the top endplate 120 is inserted into the cover 104, the top endplate 120 is rotated until the slots 144 slidingly engage the posts 134. As shown in FIG. 13, the tabs 132 are configured to move (e.g., flex) past the protrusions 142 and engage protrusion wall portions 145 once the posts 134 are received within the slots 144. Accordingly, when the cover 104 is being removed from the filtration system 100, the top endplate 120 (and thus, the filter element 112) is removed along with the cover 104. When the cover 104 is detached (e.g., unscrewed) from the base 106 and axially removed, the filter element 112 is also axially removed. This allows for effective removal of a filter element 112 for servicing purposes. In addition, this configuration facilitates drain timing during service.

Referring to FIG. 14, another embodiment of the top endplate 220 is shown. The top endplate 220 includes a top surface 237 and a bottom surface 239, with an outer perimeter 236 extending therebetween. The endplate central opening 222 extends through the top endplate 220 along a longitudinal axis 225. The top endplate 220 includes one or more engagement features 230 protruding outward from the outer perimeter 236. The engagement features 230 are configured to interact with retainer features 140 in the cover 104 upon installation of the top endplate 220 into the cover 104. Each engagement feature 230 includes a first portion 232 and a second portion 234 arranged in an L-shaped configuration. The first portion 232 extends substantially axially (e.g., parallel to the longitudinal axis 225) along the outer perimeter 236. The second portion 234 extends substantially perpendicular to the first portion 232 (e.g., perpendicular to the longitudinal axis 225). The first portion 232 is configured to be received within the pathway (e.g., groove) formed by each slot 144 on the cover 104. The second portion 234 includes a wall portion 231 configured to contact one or more protrusion wall portions 145 when the first portion 232 is inserted into the pathway formed by the slots 144. In other embodiments, the first and second portions 232, 234 are not formed as a single piece.

References herein to the positions of elements (e.g., "top," "bottom," "above," "below," etc.) are merely used to describe the orientation of various elements in the Figures. It should be noted that the orientation of various elements may differ according to other example embodiments, and that such variations are intended to be encompassed by the present disclosure. Further, the formation of a passage by one or more surfaces can comprise a wide variety of passage cross-sectional shapes, for example, passages having circular, rectangular, oval, etc. cross-sectional shapes.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications to the flow structures are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filter element, the filter element comprising:
   filter media; and
   an endplate coupled to one end of the filter media, the endplate comprising an outer perimeter extending between a top surface and a bottom surface of the endplate and one or more engagement features protruding from the outer perimeter, each of the one or more engagement features each comprising a post and a tab protruding from the outer perimeter, the post disposed axially and circumferentially offset from the tab, the post positioned proximate the top surface of the end plate and the tab positioned proximate the bottom surface of the endplate, each of the one or more engagement features configured to engage one or more retainer features in a cover of a filter housing upon installation of the endplate into the cover, thereby coupling the endplate to the cover.

2. The filter element of claim 1, wherein the outer perimeter extends axially between the top surface and the bottom surface.

3. The filter element of claim 2, wherein, for each of the one or more engagement features, the tab comprises a sloped portion and a tab wall portion, the tab wall portion extending axially along the outer perimeter.

4. The filter element of claim 3, wherein, for each of the one or more engagement features, the sloped portion extends outward from the outer perimeter, an angle of the sloped portion increasing in a clockwise direction when the endplate is viewed from above the top surface.

5. The filter element of claim 4, wherein, for each of the one or more engagement features, the sloped portion extends between the outer perimeter and the tab wall portion.

6. The filter element of claim 4, wherein, for each of the one or more engagement features, the post is configured to engage with a slot on the cover and the tab wall portion is engagable with a protrusion on the cover when the endplate is inserted into the cover.

7. The filter element of claim 6, wherein, for each of the one or more engagement features, the tab is configured to flex past the protrusion on the cover and the tab wall portion is configured to engage a protrusion wall portion when the post is received within a pathway formed by the slot on the cover.

8. The filter element of claim 3, wherein, for each of the one or more engagement features, the post extends in a substantially perpendicular direction relative to the tab wall portion.

9. The filter element of claim 1, wherein, for each of the one or more engagement features, the tab extends below the bottom surface of the top endplate.

10. The filter element of claim 1, wherein the endplate defines an endplate central opening extending therethrough along a longitudinal axis of the filter element.

11. The filter element of claim 10, wherein, for each of the one or more engagement features, the post projects radially away from the endplate central opening.

12. The filter element of claim 1, wherein the one or more engagement features comprises four engagement features.

\* \* \* \* \*